Patented Aug. 7, 1934

1,969,218

UNITED STATES PATENT OFFICE 1,969,218

PRODUCTION OF BUTYL ALCOHOL BY FERMENTATION

Clarence W. Hancock, Peoria, Ill., assignor to Commercial Solvents Corporation, Terre Haute, Ind., a corporation of Maryland No Drawing. Application November 28, 1932, Serial No. 644,694

14 Claims. (Cl. 260—135)

The present invention relates to the production of n-butyl alcohol and other useful products by fermentation. More particularly, it pertains to the production of increased yields of butyl alcohol and other useful products by the utilization of by-products formed in the butyl fermentation process.

In the past it has been the custom to use as the raw material in the butyl fermentation process carbohydrates of both amylaceous or saccharine nature. Examples of the former are maize, kaffir corn, wheat, oats, etc., and of the latter, black strap molasses, "hydrol", "wood sugars", xylose, etc. When cereals are used they are ground to a fairly coarse meal and the bran generally removed. In the case of maize, it is the custom also to remove the germ during this stage of the treatment. Sufficient of this meal or other carbohydrate is then added to water to give a concentration of approximately 6–9% by weight and the resulting mash subjected to a suitable cooking for the purpose of thoroughly sterilizing the material and at the same time breaking down the starch particles into a form more easily acted upon by microorganisms. The sterile mash thus obtained is cooled to approximately 97° F., inoculated with a culture of butyl alcohol-acetone forming organisms and fermentation allowed to proceed. At the end of the fermentation, the products consisting essentially of n-butyl alcohol, acetone, and ethyl alcohol in approximately the proportions by weight of 6:3:1 may be separated and recovered by fractional distillation or by other suitable means. In some cases, isopropyl alcohol may also be produced in appreciable quantities.

In the case of sterile maize mash of 8% concentration, a normal fermentation is completed within thirty-six to seventy-two hours, and there is obtained a solvent yield of about 25–27% by weight of the dry maize depending on the raw material used. In addition to the products just enumerated, large volumes of hydrogen and carbon dioxide gases are evolved during the fermentation and small quantities of other materials are formed. Among the latter are small quantities of formic, acetic, butyric, 1-leucic, caprylic, capric acids, etc.

At the conclusion of a fermentation a mash is obtained containing about 2% by weight of a mixture of n-butyl alcohol, acetone and ethyl alcohol, traces of the various materials enumerated above, unfermented carbohydrate and protein matter, etc. and the remainder water. In the customary procedure for the recovery of the valuable solvent materials the fermented mash is first subjected to distillation in an ordinary plate or "beer" still. This operation serves to raise the concentration of the mixed solvents in the resulting distillate to approximately 50% by weight. This distillate is next placed in an ordinary pot or discontinuous still and there subjected to fractional distillation to recover the acetone, ethanol, and n-butyl alcohol.

The charge of approximately 50% water and 50% mixed solvents obtained from the beer still and which is ordinarily called the "AB charge", contains in addition to the solvents, a portion of the acids present in the original mash. On subjecting the "AB charge" to further fractional distillation the acetone first distills over, followed later by mixtures of acetone and ethyl alcohol, ethyl alcohol and water, butyl alcohol and water, etc. Unless certain precautions are taken during this distillation a portion or all of the acids present in the "AB charge" will also come over with the solvent materials, particularly with the acetone. The presence of even relatively small amounts of acids in acetone or the other solvents obtained in the butyl fermentation process is ordinarily undesirable. It has now been found that these acids may be satisfactorily separated from the solvents by treating the "AB charge" with a sufficient amount of caustic soda or other neutralizing agent to convert the acids present into their corresponding salts. By distilling the solvents from a charge thus treated, solvents are obtained which are of a highly satisfactory grade. Solvents obtained in this manner are particularly low in acids, thus making them better suited for a number of uses than products previously used.

In addition to the advantages just enumerated the present invention has certain equally, if not more important advantages. According to the procedures which have previously been employed for the reduction of the acidity of the solvents produced in the butyl fermentation process these acids, although present in only small quantities, have been thrown away for the reason that they were present in such small quantities that it did not appear to be profitable to attempt to recover, separate and purify them so that they might be suitably employed in other commercial processes. It has now been discovered that these acids may be cheaply and efficiently utilized in the butyl fermentation process where they serve to increase materially the total yield of solvents obtained from a given amount of raw material fermented.

After the removal of the solvents from the "AB charge", as outlined above, there remains in the still an aqueous solution of the salts of the organic acids. In the past this aqueous residue containing the traces of acids which did not distill over with the solvents was discharged into the sewer as valueless. It has now been found that this aqueous solution containing small amounts of salts of the various organic acids hereinabove listed can be employed in the place of water used to make up mash to be utilized in subsequent fermentations. A preferred method of operation is disclosed in the example cited below. It is distinctly understood, however, that this is given merely as an illustration and that the present invention is in no way limited to the specific procedure described since the process may be suitably modified in a number of ways without departing from the concept of the invention.

*Example*

An "AB charge" (consisting of approximately 50% water and approximately 50% of a mixture of n-butyl alcohol, acetone, and ethyl alcohol; and in some instances also substantial amounts of isopropyl alcohol), amounting to about 28,000 to 33,000 gallons, is treated with an amount of caustic soda substantially in excess of the amount required to neutralize the acids present in the solution, say about 8 lbs. of caustic soda per 1000 gallons of "AB charge". After the removal of the solvents by distillation there ordinarily remains 14,000 to 15,000 gallons of liquid consisting essentially of water containing in solution the sodium salts of the various acids in the "AB charge". In place of caustic soda other materials capable of serving as neutralizing agents for the said organic acids, as for example, alkaline compounds of alkali or alkaline earth metals such as the oxides, hydroxides, carbonates, etc. may be used. It is important, however, that use not be made of a material which is either in itself toxic or produces a substance toxic to butyl bacteria, or which during the distillation would liberate carbon dioxide or other material which might affect the quality of the solvents being distilled.

The aqueous solution obtained from the "AB charge" as above described is then used as follows in subsequent fermentations in the butyl fermentation process. As previously indicated, a mash is made up consisting of a 6% to 9% (or other suitable) concentration by weight of carbohydrate, such as for example, maize meal, and using the neutralized aqueous solution from the "AB charge" in place of the usual water. This mash is then sterilized, cooled, inoculated and fermented as usual. In ordinary plant scale operation, however, there is never a sufficient amount of this liquid available to supplant all of the water, and hence it is preferred, in order to obtain uniform operating conditions, to substitute only a part of the water in each charge of fermentation mash by this neutralized liquor from the "AB charge". A satisfactory operating ratio has been found to be about 1200 gallons of this liquor to each charge of mash consisting of about 42,000 gallons. It is distinctly understood, however, that larger amounts may be satisfactorily employed, where available.

When using only relatively small proportions of neutralized liquor from "AB charges" somewhat more favorable results appear to be obtained when it is added to the mash after the latter is already vigorously fermenting. In this case, it is preferred to proceed somewhat as follows: A maize or other suitable carbohydrate mash is prepared and sterilized in the customary manner, as for example, according to the procedures disclosed in U. S. Patents Nos. 1,315,585, 1,582,408, 1,655,435, etc. After cooling to approximately 97° F., this sterile mash is introduced into a suitable fermenter together with a culture of butyl alcohol-producing bacteria, the fermenter being filled to approximately three-fourths its usual capacity. According to a preferred modification of procedure the remaining one-fourth of the charge is made up just as in the case of the regular mash with the exception that 10–12% of the water ordinarily employed in making up the mash is substituted by neutralized liquor from an "AB charge". This remaining portion of the total charge is usually added to the fermenter several hours after fermentation therein has begun, i. e., about the time the peak of acidity in the fermenting mash has begun to fall.

If desired, the maize meal or other amylaceous material may be substituted in part or wholly by equivalent amounts of saccharine materials such as black strap molasses, "wood sugars", xylose, etc. In some cases, where saccharine materials are used more desirable results are obtained by adding such mashes to an already vigorously fermenting maize mash. In such cases the neutralized "AB residue" may of course be added with the latter.

The data given in the table below will serve to illustrate the advantageous results obtained by following the procedure hereinabove disclosed.

*Table*

| Series | Neutralized AB cc./100 cc. of mash | Yield total solvents % of maize | Increase in yield % |
|---|---|---|---|
| a | 0 | 30.4 | |
|  | 3 | 31.0 | .6 |
|  | 5 | 31.6 | 1.2 |
|  | 10 | 32.2 | 1.8 |
| b | 0 | 27.1 | |
|  | 100 | 28.7 | 1.6 |
| c | 0 | 28.4 | |
|  | 100 | 29.7 | 1.3 |
| d | 0 | 27.9 | |
|  | 100 | 29.2 | 1.3 |

From the above it is seen that the substitution of neutralized "AB residue" either partially or wholly for the water ordinarily used in making up the mash gives decidedly improved results. While the average increase in yield in all of the experiments cited above amounts to only 1.3%, this represents a percentage increase of more than 4% over that obtained without the addition of neutralized "AB charge". Such an increase in yield is a very important factor in a fermentation process where the raw material cost represents the largest single item of expense.

In the procedure outlined above for the purpose of illustrating the present invention, caustic soda was used as the agent for neutralizing the acids present in the "AB charge". It is not to be understood, however, that the invention is limited to the use of this particular material as any other inorganic base may be employed so long as the small quantities required have no appreciably deleterious effect upon the solvents being treated or where the small quantities of salts formed by the base do not exert an appreciably harmful effect upon the butyl-acetonic bacteria. Other suitable materials for use in this step of the process are soda ash, calcium carbonate, calcium hydroxide, barium, carbonate, etc.

It is understood also that the process is not limited to the use of any particular form of butyl bacteria. Any of the butyl bacteria such as those designated by previous investigators under the following names are particularly applicable: *Clostridium acetobutylicum* (Weizmann), *Bacillus granulobacter pectinovorum*, *Bacillus amylobacter*, *Bacillus butyricus*, *Bacillus butylaceticum*, *Bacillus acetobutylicum*, etc.

What is claimed is:

1. A fermentation process which comprises subjecting to the action of butyl alcohol-producing bacteria a mash comprising carbohydrate material and the neutralized residue obtained from the redistillation of the distillate from the primary distillation of fermented mash from a butyl alcohol fermentation, said primary distillate having been neutralized by means of an inorganic alkaline reacting compound.

2. A fermentation process which comprises subjecting to the action of butyl alcohol-producing bacteria a mash comprising amylaceous material and the neutralized residue obtained from the redistillation of the distillate from the primary distillation of fermented mash from a butyl alcohol fermentation, said primary distillate having been neutralized by means of an inorganic alkaline reacting compound.

3. A fermentation process which comprises subjecting to the action of butyl alcohol-producing bacteria a mash comprising cereal meal and the neutralized residue obtained from the redistillation of the distillate from the primary distillation of fermented mash from a butyl alcohol fermentation, said primary distillate having been neutralized by means of an inorganic alkaline reacting compound.

4. A fermentation process which comprises subjecting to the action of butyl-acetonic bacteria a mash comprising maize meal and the neutralized residue obtained from the redistillation of the distillate from the primary distillation of fermented mash from a butyl-acetonic fermentation, said primary distillate having been neutralized by means of an inorganic alkaline reacting compound.

5. A fermentation process which comprises subjecting to the action of butyl alcohol-producing bacteria a mash comprising amylaceous material, saccharine material, and the neutralized residue obtained from the redistillation of the distillate from the primary distillation of fermented mash from a butyl alcohol fermentation, said primary distillate having been neutralized by means of an inorganic alkaline reacting compound.

6. A fermentation process which comprises subjecting to the action of butyl alcohol-producing bacteria a mash comprising cereal meal, saccharine material, and the neutralized residue obtained from the redistillation of the distillate from the primary distillation of fermented mash from a butyl alcohol fermentation, said primary distillate having been neutralized by means of an inorganic alkaline reacting compound.

7. A fermentation process which comprises subjecting to the action of butyl alcohol-producing bacteria a mash comprising maize meal, saccharine material, and the neutralized residue obtained from the redistillation of the distillate from the primary distillation of fermented mash from a butyl alcohol fermentation, said primary distillate having been neutralized by means of an inorganic alkaline reacting compound.

8. A fermentation process which comprises subjecting to the action of butyl-acetonic bacteria a mash comprising maize meal, hydrol, and the neutralized residue obtained from the redistillation of the distillate from the primary distillation of fermented mash from a butyl-acetonic fermentation, said primary distillate having been neutralized by means of an inorganic alkaline reacting compound.

9. In a process for the production of normal butyl alcohol and other products by fermentation, the steps which comprise subjecting the fermented mash to a primary distillation, neutralizing the resulting distillate by means of an inorganic alkaline reacting compound, subjecting the neutralized distillate to redistillation, and substituting the resulting neutralized residue from said redistillation for at least a part of the water used in preparing mash for a subsequent fermentation.

10. In a process for the production of normal butyl alcohol and other products by fermentation, the steps which comprise subjecting the fermented mash to a primary distillation, neutralizing the resulting distillate by means of an inorganic alkaline reacting compound, subjecting the neutralized distillate to redistillation, substituting the resulting neutralized residue from said redistillation for at least a part of the water used in preparing mash for a subsequent fermentation, and subjecting said mash to the action of butyl alcohol-producing bacteria.

11. In a process for the production of normal butyl alcohol and acetone by fermentation, the steps which comprise subjecting the fermented mash to a primary distillation, neutralizing the resulting distillate by means of an inorganic alkaline reacting compound, subjecting the neutralized distillate to redistillation, substituting the resulting neutralized residue from said redistillation for at least a part of the water used in preparing mash for a subsequent fermentation, and subjecting said mash to the action of butyl-acetonic bacteria.

12. In a process for the production of normal butyl alcohol and other products by fermentation, the steps which comprise inoculating a sterile carbohydrate mash with butyl alcohol-producting bacteria and, after active fermentation has set in, adding to said fermenting mash additional mash containing carbohydrate material and the neutralized residue obtained from the redistillation of the distillate from the primary distillation of fermented mash from a butyl alcohol fermentation, said primary distillate having been neutralized by means of an inorganic alkaline reacting compound.

13. In a process for the production of normal butyl alcohol and other products by fermentation, the steps which comprise inoculating a sterile carbohydrate mash with butyl alcohol-producing bacteria and, after active fermentation has set in, adding to said fermenting mash additional mash containing amylaceous material, saccharine material, and the neutralized residue obtained from the redistillation of the distillate from the primary distillation of fermented mash from a butyl alcohol fermentation, said primary distillate having been neutralized by means of an inorganic alkaline reacting compound.

14. In a process for the production of normal butyl alcohol and acetone by fermentation, the steps which comprise inoculating with butyl-acetonic bacteria a sterile mash containing maize meal and, after active fermentation has set in, adding to said fermenting mash additional mash containing maize meal, hydrol, and the neutralized residue from the redistillation of the distillate from the primary distillation of fermented mash from a butyl-acetonic fermentation, said primary distillate having been neutralized by means of an inorganic alkaline reacting compound.

CLARENCE W. HANCOCK.